United States Patent

[11] 3,601,295

| [72] | Inventor | Lyall L. Lowe |
| | | 517 Dakota Ave., South Sioux City, Nebr. 68776 |
| [21] | Appl. No. | 804,970 |
| [22] | Filed | Mar. 6, 1969 |
| [45] | Patented | Aug. 24, 1971 |

[54] CLAMPING DEVICE
6 Claims, 3 Drawing Figs.

[52] U.S. Cl. .................................................. 224/42.45 R, 248/229
[51] Int. Cl. .................................................. B60r 9/00
[50] Field of Search .......................................... 224/42.03, 42.07, 42.1 G, 42.08, 42.03 A, 42.38, 42.32, 42.45, 39; 248/316, 229, 226.2

[56] References Cited
UNITED STATES PATENTS

| 1,621,176 | 3/1927 | Sonin | 224/42.38 |
| 2,430,112 | 11/1947 | Hamre | 224/42.45 UX |
| 2,807,398 | 9/1957 | Mathews | 224/42.45 X |
| 2,959,445 | 11/1960 | Breslav | 294/86 |

FOREIGN PATENTS

| 83,593 | 7/1956 | Netherlands | 248/229 |

*Primary Examiner*—Gerald M. Forlenza
*Assistant Examiner*—Frank E. Werner
*Attorney*—Lucas J. De Koster ABSTRACT: A clamp including two clamping members joined by opposite hand screws. One of the clamping members carries an additional clamp so that by clamping the first two members to an automobile, a carrier device can be carried by the automobile by means of being clamped in the second clamp.

PATENTED AUG24 1971  3,601,295

INVENTOR.
LYALL L. LOWE
BY Lucas J. Wickster
His Att'y.

CLAMPING DEVICE

This invention pertains to carrying devices of the type shown and described in my U.S. Pat. No. 3,447,727, issued June 3, 1969 in which I described a carrying device adapted to be clamped to the rocker panel of an automobile body.

The clamps shown in that application were rather elementary and while they would accomplish the intended purpose, they suffered from some deficiencies in ease of operation and the like.

My present invention is of a clamp adapted for use with the carrying device of my aforesaid application. The new clamp is adapted to clamp quickly and easily to the rocker panel, and to carry an outer bar or carrying member by means of an auxiliary clamping member carried by the rest of the clamp.

A more complete understanding of my invention in its embodiment may be had from a study of the following specification and the drawings in which.

Figure 1:
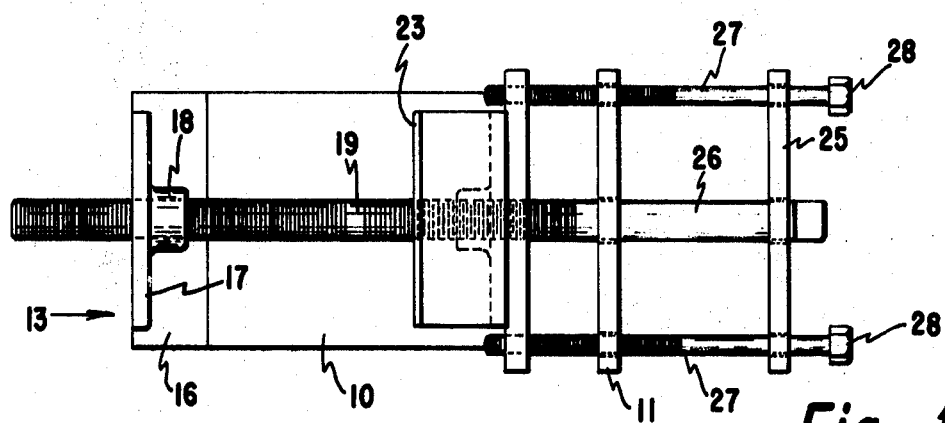
FIG. 1 is a top plan view of the device embodying my invention.
Figure 2:
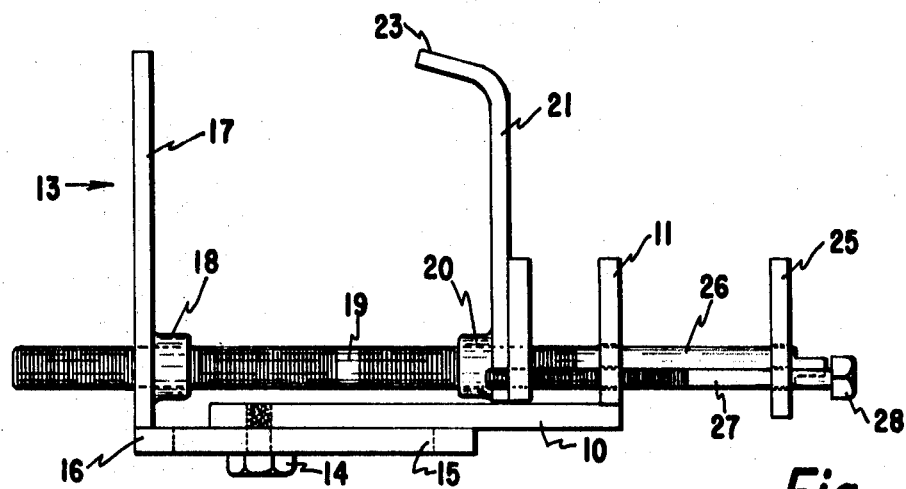
FIG. 2 is a side elevational view of the device.
Figure 3:
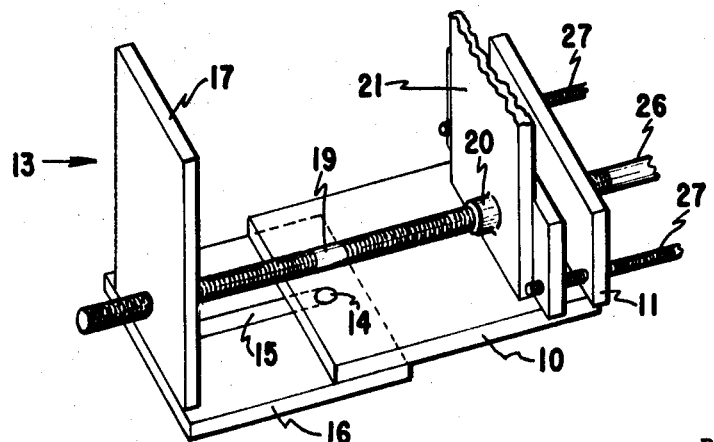
FIG. 3 is a pictorial representation of the device to a reduced scale.

Briefly my invention comprises a pair of clamping members adapted to embrace the rocker panel of an automobile body. Auxiliary clamping means are attached to one of the pair so that a carrier may be clamped within the auxiliary means so that the carrier is carried on the auto body.

More specifically, and referring to the drawings, my device includes a base member consisting of a flat plate 10 and an upright wall 11. An inner clamping member 13 is slidably mounted on the plate 10. This is accomplished by providing a cap screw 14 extending through a slot 15 in the base 16 of the member 13. The slot is large enough so that the screw 14 will slide freely through it. The screw 14 is threaded so that it will clamp the base 16 to the plate 10.

The upright plate 17 of the member 13 is adapted to engage the inner surface of the rocker panel of the usual type of automobile body. It is provided with a boss 18 through which a clamping screw 19 is threaded. This screw is also threaded through a boss 20 on an outer clamping member 21. The threads in the inner and outer members are of opposite "hands" so that turning the screw will either pull the members together or separate them in a manner well known in the art. As shown, the clamping member may be made of two portions welded or otherwise fastened together to provide stiffness. At its upper end, the clamping member is provided with an overhanging lip 23 adapted to overlap a portion of the upper surface of the rocker panel. This will provide added support for the clamp.

In order to provide a carrying means for a bar or the like running transversely of the clamp, I provide for an auxiliary clamp. This auxiliary clamp is formed between the upright 11 of the base member and a clamping plate 25. The plate 25 is slidably journaled on an extension 26 of the screw 19. This extension is also slidably journaled in the upright 11 so that both the upright wall and the plate 25 can slide relative to the screw and the screw can be turned relative to the plates.

Long clamping bolts 27 having heads 28 are threaded into the stiffening portion of the clamping member 21. These bolts extend somewhat loosely through openings in the upright wall 11 of the base member and through the clamping plate 25. By tightening the bolts against the plate 25, a clamping action can be had between that plate and the upright 11. The location of this clamping can be adjusted by releasing the screw 14 and sliding the base member relative to the clamping member 13 also, so that the auxiliary clamp is adjustable relative to the principal clamp.

Thus, after the principal clamp is fastened firmly onto the rocker panel, the auxiliary clamp may be moved inwardly or outwardly therefrom. A reference to my copending application aforementioned will indicate the importance of this since the uprights from the bar which is to be held by the auxiliary clamps must be carried in a position at least slightly spaced from the body of the automobile. Thus, the main clamps can be set and the auxiliary clamp spaced for the best positioning of the uprights as indicated in my aforesaid copending application.

Having thus described my invention in its embodiment, I am aware that further and extensive variations may be made therefrom without departing from the spirit and scope of my invention as limited only by the following claims:

I claim:

1. For use with an automobile body having a rocker panel, dual clamping means comprising a principal clamp including an inner member and an outer member joined together by screw means, said screw means including two screw thread systems, one of right-hand thread and one of left-hand thread, each of said systems engaging a separate one of said members, said members being adapted to engage said rocker panel in a clamping engagement, and an auxiliary clamp adjustably mounted on said principal clamp for adjustment laterally of said rocker panel whereby said auxiliary clamp may be adjusted toward and away from said rocker panel.

2. The device of claim 1, in which said outer member is formed with an overhanging lip engageable with part of said rocker panel.

3. The device of claim 1, in which at least part of said auxiliary clamp is adjustably fastened to said inner member, 4. The device of claim 3, in which said auxiliary clamp is formed of upright wall means and a clamping plate, said screw means including an extension on which said wall means and said plate are journaled, and bolts extending through said wall means and said plate whereby said wall means and said plate can be clamped together.

5. The device of claim 4, in which said wall means is affixed to a base means, said base means being adjustably fastened to said inner clamping means to provide for adjustment between the principal and auxiliary clamps.

6. The device of claim 4 in which, said bolt means is slidable through said wall means and said clamping plate and is threadably engaged with said outer member of the principal clamp.